United States Patent
Dohi

(10) Patent No.: US 9,268,150 B2
(45) Date of Patent: Feb. 23, 2016

(54) DOUBLE CONVEX COLLIMATOR LENS, ILLUMINATION DEVICE, AND MICROSCOPE

(71) Applicant: OLYMPUS CORPORATION, Shibuya-ku, Tokyo (JP)

(72) Inventor: Masahito Dohi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 240 days.

(21) Appl. No.: 13/896,217

(22) Filed: May 16, 2013

(65) Prior Publication Data

US 2013/0314777 A1 Nov. 28, 2013

(30) Foreign Application Priority Data

May 24, 2012 (JP) ................................. 2012-118949

(51) Int. Cl.
| | |
|---|---|
| *G02B 21/06* | (2006.01) |
| *G02B 27/30* | (2006.01) |
| *F21V 5/04* | (2006.01) |
| *G02B 21/00* | (2006.01) |
| *G02B 21/16* | (2006.01) |
| *G02B 21/26* | (2006.01) |

(52) U.S. Cl.
CPC . *G02B 27/30* (2013.01); *F21V 5/04* (2013.01); *G02B 21/0032* (2013.01); *G02B 21/0076* (2013.01); *G02B 21/06* (2013.01); *G02B 21/16* (2013.01); *G02B 21/26* (2013.01)

(58) Field of Classification Search
USPC ................................. 359/385–389
See application file for complete search history.

(56) References Cited

U.S. PATENT DOCUMENTS

| | | |
|---|---|---|
| 5,966,362 A | 10/1999 | Arai et al. |
| 2005/0169155 A1 | 8/2005 | Kim et al. |
| 2008/0106998 A1 | 5/2008 | Ito |
| 2010/0110861 A1 | 5/2010 | Yamagata et al. |
| 2010/0271696 A1 | 10/2010 | Dohi et al. |

(Continued)

FOREIGN PATENT DOCUMENTS

| | | | |
|---|---|---|---|
| JP | 04114117 A | 4/1992 |
| JP | 04163510 A | 6/1992 |
| JP | 09185836 A | 7/1997 |

(Continued)

OTHER PUBLICATIONS

Japanese Office Action (and English translation thereof) dated Dec. 15, 2015, issued in counterpart Japanese Application No. 2012-118949.

*Primary Examiner* — Stephone B Allen
*Assistant Examiner* — Tamara Y Washington
(74) *Attorney, Agent, or Firm* — Holtz, Holtz & Volek PC

(57) ABSTRACT

A collimator lens is configured with a double convex single lens formed with a resinous material, for collimating a light flux emitted from a light source. At least one of surfaces of the collimator lens is formed as an aspherical surface. The collimator lens satisfies following conditions:

$2 < |R1/R2| < 10;$ $NA > 0.6,$ where R1 is a curvature radius of a first surface, which is a lens surface on a side of the light source of the collimator lens, R2 is a curvature radius of a second surface, which is a lens surface on a side opposite to the first surface of the collimator lens, and NA is a numerical aperture on the side of the light source of the collimator lens.

7 Claims, 10 Drawing Sheets

(56) References Cited

U.S. PATENT DOCUMENTS

| | | |
|---|---|---|
| 2011/0235171 A1 | 9/2011 | Dohi et al. |
| 2012/0057447 A1 | 3/2012 | Nakagawa |

FOREIGN PATENT DOCUMENTS

| | | | | |
|---|---|---|---|---|
| JP | 2000314840 A | | | 11/2000 |
| JP | 2005-208571 A | | | 8/2005 |
| JP | 2005208571 A | * | | 8/2005 |
| JP | 2007213800 A | | | 8/2007 |
| JP | 2008123573 A | | | 5/2008 |
| JP | 4374650 B2 | * | | 12/2009 |
| JP | 2010113745 A | | | 5/2010 |
| JP | 2010244648 A | | | 10/2010 |
| JP | 2010256491 A | | | 11/2010 |
| JP | 2011164158 A | | | 8/2011 |
| JP | 2011227441 A | | | 11/2011 |
| JP | 2012053958 A | | | 3/2012 |

* cited by examiner

DOUBLE CONVEX COLLIMATOR LENS, ILLUMINATION DEVICE, AND MICROSCOPE

CROSS-REFERENCE TO RELATED APPLICATIONS

This application is based upon and claims the benefit of priority from prior Japanese Patent Application No. 2012-118949, filed on May 24, 2012, the entire contents of which are incorporated herein by this reference.

BACKGROUND OF THE INVENTION

1. Field of the Invention

The present invention relates to a collimator lens, an illumination device including the collimator lens, and a microscope including the illumination device, and more particularly, to a collimator lens configured with a single lens, an illumination device including the collimator lens, and a microscope including the illumination device.

2. Description of the Related Art

In a fluorescent observation using a microscope, an illumination device including a xenon light source, a high-pressure mercury light source or the like, by which a high output can be obtained, has been widely used to excite a fluorescent substance heretofore. With a xenon light source or a high-pressure mercury light source, a radiated amount of heat is very large although a high output can be obtained. Accordingly, an optical system included in a conventional illumination device is normally designed so that a focal length is increased by a glass lens having high heat resistance.

In recent years, the need for a light source including a solid-state light emitting element having features such as less heat generation, compactness and a long life has been increasing, and, for example, an illumination device using a light source including a solid-state light emitting element as disclosed by Japanese Laid-open Patent Publication No. 2005-208571 has been developed.

The illumination device disclosed by Japanese Laid-open Patent Publication No. 2005-208571 includes a light source having an LED, which is a solid-state light emitting element, and a collimator optical system for guiding illumination light of a light distribution specific to an LED in a specified direction with high illumination efficiency.

For an illumination device used for a fluorescent observation, an excitation intensity demanded to excite a fluorescent substance needs to be secured. Accordingly, it is important for an optical system included in an illumination device, especially, an optical system of an illumination device including a solid-state light emitting element to implement a high transmittance and to irradiate light emitted from a light source efficiently on a specimen. Moreover, the illumination device including the solid-state light emitting element is expected to be more advantageous than a conventional illumination device in terms of cost.

SUMMARY OF THE INVENTION

One aspect of the present invention provides a collimator lens, configured with a double convex single lens formed with a resinous material, for collimating a light flux emitted from a light source. In the collimator lens, at least one of surfaces is formed as an aspherical surface. Assuming that R1 is a curvature radius of a first surface, which is a lens surface on the side of the light source of the collimator lens, R2 is a curvature radius of a second surface, which is a lens surface on a side opposite to the first surface of the collimator lens, and NA is a numerical aperture on the side of the light source of the collimator lens, the following expressions are satisfied.

$$2 < |R1/R2| < 10$$

$$NA > 0.6$$

Another aspect of the present invention provides an illumination device including the collimator lens according to the above described aspect, and the light source, which is a low heat generation light source.

A further aspect of the present invention provides a microscope including the illumination device according to the above described aspect, and an image forming optical system for forming an image of a specimen with light from a specimen via an objective lens.

BRIEF DESCRIPTION OF THE DRAWINGS

The present invention will be more apparent from the following detailed description when the accompanying drawings are referenced.

DESCRIPTION OF THE EMBODIMENTS

Figure 1:
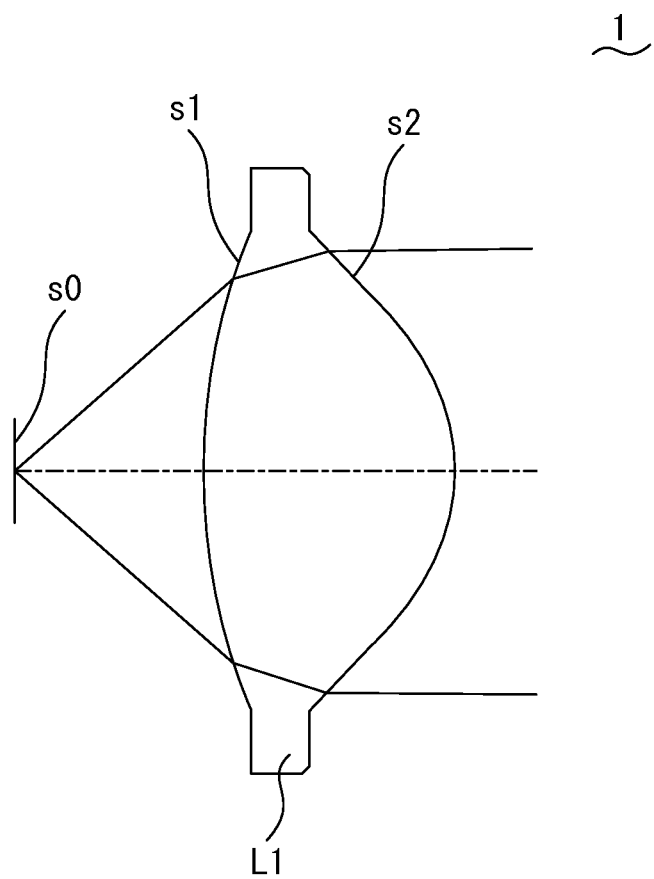
FIG. 1 illustrates a cross-section of a collimator lens according to a first embodiment of the present invention.

A basic configuration of a collimator lens according to embodiments of the present invention is initially described. The collimator lens according to the embodiments of the present invention is configured with a double convex single lens, formed with a resinous material, for collimating a light flux emitted from a light source, and has a configuration such that a second surface is formed as an aspherical surface assuming that a lens surface on the side of the light source of the collimator lens is a first surface and a lens surface on a side opposite to the first surface is the second surface. The embodiments respectively refer to the collimator lens where the second surface is an aspherical surface. However, the collimator lens may have any configuration as long as at least one of surfaces of the collimator lens is formed as an aspherical surface, and also the first surface may be formed as an aspherical surface in addition to the second surface.

As described above, the collimator lens according to the embodiments of the present invention is configured with a small number of lenses. Therefore, the collimator lens can be manufactured at low cost, and can implement a high transmittance by reducing the total amount of light reflection and light absorption.

Additionally, the collimator lens according to the embodiments is configured so that the following expressions are satisfied.

$$2 < |R1/R2| < 10 \quad (1)$$

$$NA > 0.6 \quad (2)$$

where R1 is a curvature radius of the first surface, which is a lens surface on the side of the light source of the collimator lens, R2 is a curvature radius of the second surface, which is a lens surface on the side opposite to the first surface of the collimator lens, and NA is a numerical aperture on the side of the light source of the collimator lens.

The expression (1) is an expression that stipulates a distribution of refractive powers of the first and the second surfaces. With the expression (1), the shape is stipulated to the shape where a spherical aberration of the lens can be satisfactorily corrected and the shape that is suitable for injection molding using a resinous material.

If the value of the distribution becomes smaller than the lower limit value, the curvature radius of the first surface decreases to excessively increase the refractive power of the first surface. Therefore, the light flux that can be captured from the light source is thinned. Accordingly, aspherical effects on the second surface are not sufficiently produced, thereby making it difficult to correct the spherical aberration. In contrast, if the value of the distribution exceeds the upper limit value, the curvature radius of the second surface excessively decreases with respect to that of the first surface. Such a shape is preferable in correcting the aberration since the refractive power of the second surface is higher than that of the first surface. However, this shape makes it difficult to sufficiently secure a thickness of an edge demanded for injection molding using a resinous material. Accordingly, this shape significantly differs from that suitable for the injection molding. Alternatively, a sufficient thickness of the edge can be secured while maintaining the refractive power of the second surface by reducing an effective diameter of the second surface. In this case, however, brightness of an illumination, on which the prime importance is to be placed as an illumination optical system, drops. As a result, it becomes difficult to obtain the numerical aperture represented by the expression (2).

Normally, in injection molding using a resinous material, the thickness of an edge needs to range from approximately one third to one fifth of the thickness of a lens (thickness on an optical axis). If the thickness of the edge does not fall within this range, a sufficient pressure is not applied to the resinous material on a lens surface far from the edge portion into which the resinous material is poured. Therefore, a lens surface of sufficient surface precision cannot be obtained, and performance of a manufactured collimator lens is not stabilized. Moreover, since a cooling rate of the resinous material significantly varies within the lens, optical performance of the lens is degraded due to an occurrence of an internal distortion. For these reasons, the performance of the manufactured lens is not stabilized if the shape of the lens is a shape that has an insufficient thickness of the edge and is unsuitable for the injection molding. Consequently, a yield is reduced, leading to an increase in a manufacturing cost.

The expression (2) is an expression that stipulates a numerical aperture, demanded for a collimator lens, for capturing diverging light from the light source into the illumination optical system. If the numerical aperture becomes lower than the lower limit value of the expression (2), brightness of illumination, on which the prime importance is to be placed as an illumination optical system, is not secured.

The collimator lens configured with the double convex lens L1 having a shape that satisfies the expressions (1) and (2) can implement bright illumination and satisfactory aberration characteristics despite being formed with a resinous material having refractive power lower than a glass material. Moreover, satisfactory manufacturability can be achieved by securing a needed thickness of the edge, whereby stable performance can be secured at low cost by means of injection-molding using a resinous material less expensive than glass. Namely, the collimator lens having satisfactory and stable optical performance can be manufactured at low cost.

Additionally, the shape of the aspherical surface of the collimator lens is defined by the following expression (3). Preferably, the aspherical surface of the collimator lens satisfies an expression (4). More preferably, the aspherical surface satisfies an expression (5) between aspherical coefficients of an even-numbered order equal to or higher than a second order.

$$Z = \frac{Y^2}{R_0 + R_0\sqrt{1-(K+1)(Y/R_0)^2}} + \sum_{i=1}(A_{2i}Y^{2i}) \quad (3)$$

$$|A_{2i}| < 0.1 \quad (4)$$

$$|A_{2i}| < |A_{2(i-1)}| \quad (5)$$

where Z is a coordinate in a direction of an optical axis of an aspherical surface, Y is a coordinate in a direction orthogonal to the optical axis of the aspherical surface, K is a conic constant, $R_0$ is a paraxial curvature radius of the aspherical surface, $A_{2i}$ is an aspherical coefficient of an even-numbered order, and $A_{2(i-1)}$ is an aspherical coefficient of an even-numbered order lower than $A_{2i}$.

The expression (4) is an expression that stipulates the amount of displacement of an aspherical surface with respect to a paraxial curvature radius. If an aspherical surface of the collimator lens has an aspherical coefficient that is too large to satisfy the expression (4), the shape of the aspherical surface significantly differs from a spherical shape of the on a paraxial curvature radius $R_0$. Accordingly, even if the collimator lens satisfies the expression (1), the lens can possibly take a shape in which the thickness of the edge cannot be sufficiently secured and which is unsuitable for the injection molding.

Additionally, optical performance of an aspherical surface having a large aspherical coefficient is significantly degraded due to a slight manufacturing error in normal cases. Therefore, the collimator lens is susceptible to influences of manufacturing errors, and illumination performance is difficult to be stabilized. Accordingly, a tolerable manufacturing error is small, and molding of high precision is demanded, leading to low manufacturability and difficulties in low-cost manufacturing.

The expression (5) is an expression representing that an aspherical coefficient decreases with an increase in an order. Normally, if a value of an aspherical coefficient is unchanged, more influences are exerted on a shape as an order increases. Accordingly, it is preferable that an aspherical coefficient of a higher-order has a smaller value in order to prevent the shape of a lens from differing from that suitable for the injection molding.

More preferably, the collimator lens satisfies an expression (6).

$$nF < f/WD \quad (6)$$

where nF is a refractive index with respect to an F line of the collimator lens, f is a focal length of the collimator lens, and WD is a distance on the optical axis between the light source and the first surface of the collimator lens.

The expression (6) is an expression that stipulates a balance between the focal length of the collimator lens and a distance from the collimator lens to the light source based on a relationship with the refractive index, and stipulates a condition for securing the thickness of the edge of the lens while using a material having a relatively low refractive index, such as a resinous material. If the balance between the focal length and the distance to the light source does not satisfy the expression (6), it becomes difficult to satisfy the expression (2) that stipulates a numerical aperture when attempts are made to secure the thickness of the lens while satisfying the expression (1) that stipulates the shape of a lens surface. Accordingly, to satisfy the expressions (1) and (2) without satisfying the expression (6), a material having a high refractive index needs to be selected, leading to a degradation of material selectivity and an increase in a manufacturing cost.

The collimator lens that satisfies the expressions (1) and (2) may satisfy an arbitrary combination of the expressions (4) to (6).

First Embodiment

FIG. 1 illustrates a cross-section of a collimator lens according to a first embodiment. The collimator lens illustrated in FIG. 1 is configured with a double convex single lens, formed with a resinous material, for collimating a light flux emitted from a light source. The collimator lens 1 is configured so that a second surface is formed as an aspherical surface assuming that a lens surface on the side of the light source is a first surface and a lens surface on a side opposite to the first surface is the second surface.

Various types of data of the collimator lens 1 according to this embodiment are described below.

A wavelength WL1 used in the calculation, a distance WD on an optical axis between the light source and the first surface of the collimator lens 1, a numerical aperture NA on the side of the light source of the collimator lens 1, and a focal length f of the collimator lens 1 are as follows.

WL1=486.13 nm, $WD$=6.8976 mm, NA=0.6732, $f$=12.02563 mm

Lens data of the collimator lens 1 is as follows.

| s  | r       | d      | nF      | vd    |
|----|---------|--------|---------|-------|
| 0  | INF     | 6.8976 | 1.0     |       |
| 1  | 24.3105 | 9.2500 | 1.53170 | 56.00 |
| 2* | −7.5300 | INF    | 1.0     |       |

Here, s, r, d, nF, and vd respectively indicate a surface number, a curvature radius (mm), an interval between surfaces (mm), a refractive index with respect to an F line, which is a wavelength WL1, and an Abbe number. A surface number s0, a surface number s1, and a surface number s2 respectively indicate an emission plane of the light source, the first surface of the collimator lens 1, and the second surface, which is an aspherical surface, of the collimator lens 1.

The aspherical surface (second surface) of the collimator lens 1 is represented by the above described expression (3). A paraxial curvature radius $R_0$, a conic constant K, an aspherical coefficient $A_2$ of a second order, an aspherical coefficient $A_4$ of a fourth order, an aspherical coefficient $A_6$ of a sixth order, an aspherical coefficient $A_8$ of an eighth order, and an aspherical coefficient $A_{10}$ of a tenth order are as follows.

$R_0$=−7.5300, $K$=−1.0, $A_2$=0.0, $A_4$=−6.1156*$10^{-5}$, $A_6$=−9.8913*$10^{-7}$, $A_8$=2.4417*$10^{-8}$, $A_{10}$=7.7095*$10^{-12}$

|R1/R2|=3.228

Accordingly, the collimator lens 1 satisfies all the expressions (1) to (6).

Figure 2:
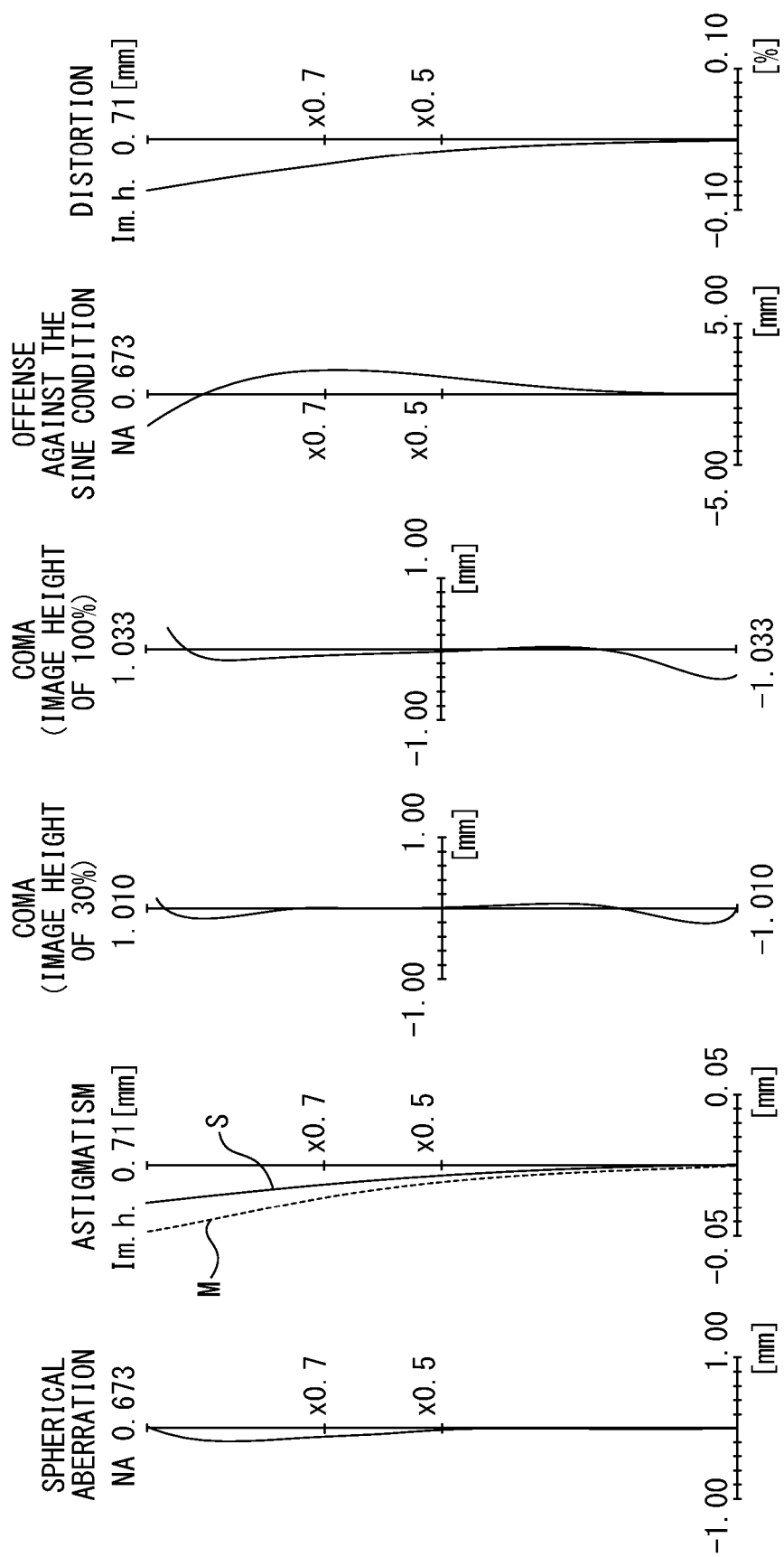
FIG. 2 illustrates aberrations of the collimator lens according to the first embodiment of the present invention.

FIG. 2 illustrates aberrations of the collimator lens 1 according to this embodiment, and illustrates the aberrations when a backlight obtained by making parallel light heading from the side of a specimen to the side of the light source incident to the collimator lens is tracked. Graphs illustrated in FIG. 2 respectively indicate, sequentially from the left side, a spherical aberration, an astigmatism, a coma in an image height of 30 percent, a coma in an image height of 100 percent, an offense against the sine condition, and a distortion. FIG. 2 represents that all the aberrations are satisfactorily corrected. A solid line and a broken line within the graph of the astigmatism respectively represent an astigmatism of a sagittal ray (S) and that of a meridional ray (M).

Second Embodiment

Figure 3:
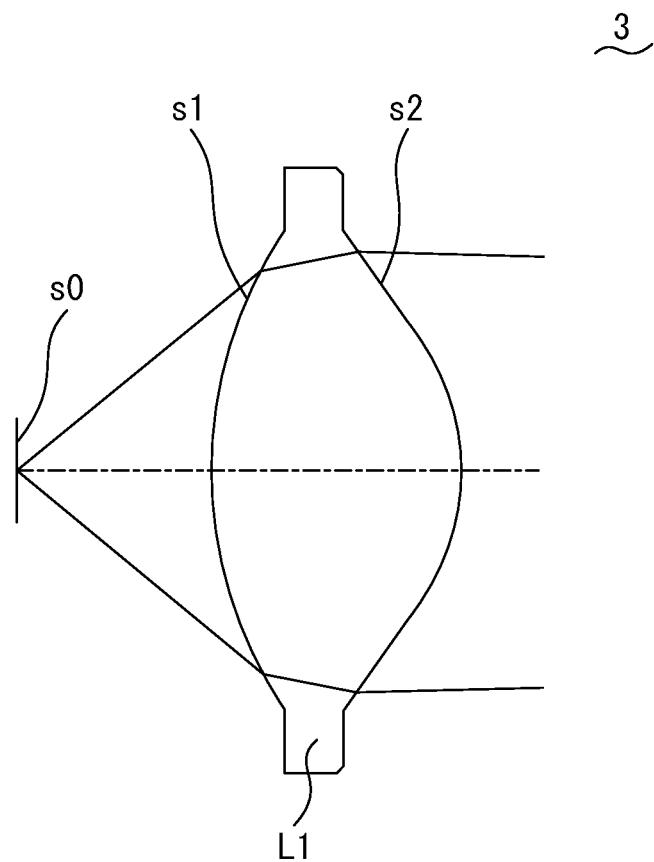
FIG. 3 illustrates a cross-section of a collimator lens according to a second embodiment of the present invention.

FIG. 3 illustrates a cross-section of a collimator lens according to a second embodiment. The collimator lens 3 illustrated in FIG. 3 is configured with a double convex single lens, formed with a resinous material, for collimating a light flux emitted from a light source, and configured so that a second surface is formed as an aspherical surface assuming that a lens surface on the side of the light source is a first surface and a lens surface on a side opposite to the first surface is the second surface.

Various types of data of the collimator lens 3 according to this embodiment are described below.

A wavelength WL1 used in the calculation, a distance WD on an optical axis between the light source and the first surface of the collimator lens 3, a numerical aperture NA on the side of the light source of the collimator lens 3, and a focal length f of the collimator lens 3 are as follows.

WL1=486.13 nm, $WD$=7.1074 mm, NA=0.6258, $f$=11.95182 mm

Lens data of the collimator lens 3 is as follows.

| s  | r       | d      | nF      | vd    |
|----|---------|--------|---------|-------|
| 0  | INF     | 7.1074 | 1.0     |       |
| 1  | 16.4500 | 9.2500 | 1.49832 | 57.86 |
| 2* | −7.5900 | INF    | 1.0     |       |

Here, s, r, d, nF and vd respectively indicate a surface number, a curvature radius (mm), an interval between surfaces (mm), a refractive index with respect to an F line, which is a wavelength WL1, and an Abbe number. A surface number s0, a surface number s1, and a surface number s2 respectively indicate an emission plane of the light source, the first surface of the collimator lens 3, and the second surface, which is an aspherical surface, of the collimator lens 3.

The aspherical surface (second surface) of the collimator lens 3 is represented by the above described expression (3). A paraxial curvature radius $R_0$, a conic constant K, an aspherical coefficient $A_2$ of a second order, an aspherical coefficient $A_4$ of a fourth order, an aspherical coefficient $A_6$ of a sixth order, an aspherical coefficient $A_8$ of an eighth order, and an aspherical coefficient $A_{10}$ of a tenth order are as follows.

$R_0 = -7.5900, K = -1.0, A_2 = 0.0, A_4 = -1.8400*10^{-5},$
$A_6 = -1.4250*10^{-6}, A_8 = 9.6900*10^{-8}, A_{10} = -6.6872*10^{-10}$ $|R1/R2| = 2.167$

Accordingly, the collimator lens 3 satisfies all the expressions (1) to (6).

Figure 4:
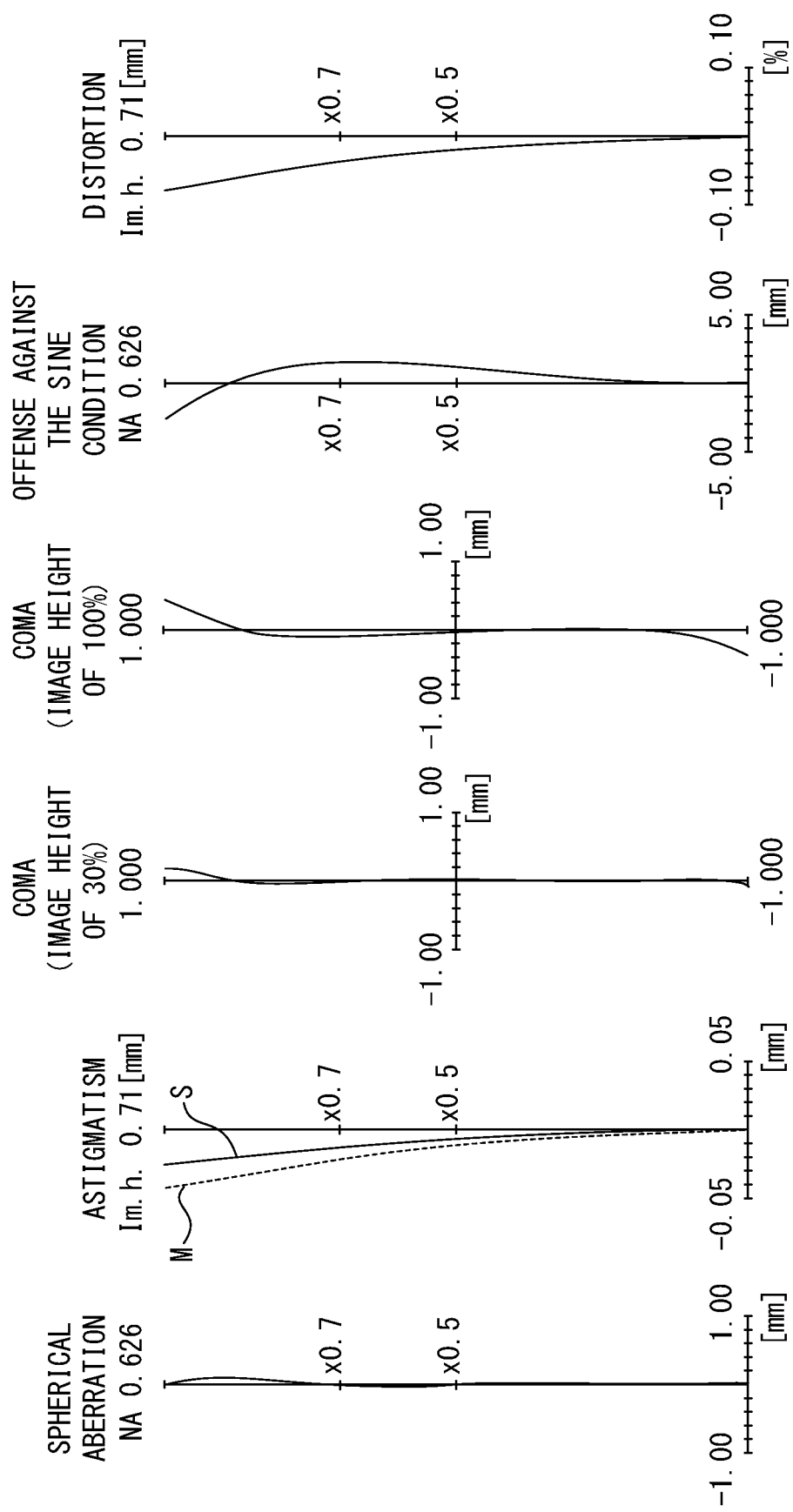
FIG. 4 illustrates aberrations of the collimator lens according to the second embodiment of the present invention.

FIG. 4 illustrates aberrations of the collimator lens 3 according to this embodiment, and illustrates the aberrations when a backlight obtained by making parallel light heading from the side of a specimen to the side of the light source incident to the collimator lens is tracked. Graphs illustrated in FIG. 4 respectively represent, sequentially from the left side, a spherical surface aberration, an astigmatism, a coma in an image height of 30 percent, a coma in an image height of 100 percent, an offense against the sine condition, and a distortion. FIG. 4 represents that all the aberrations are satisfactorily corrected. A solid line and a broken line within the graph of the astigmatism respectively represent an astigmatism of a sagittal ray (S) and that of a meridional ray (M).

Figure 5:
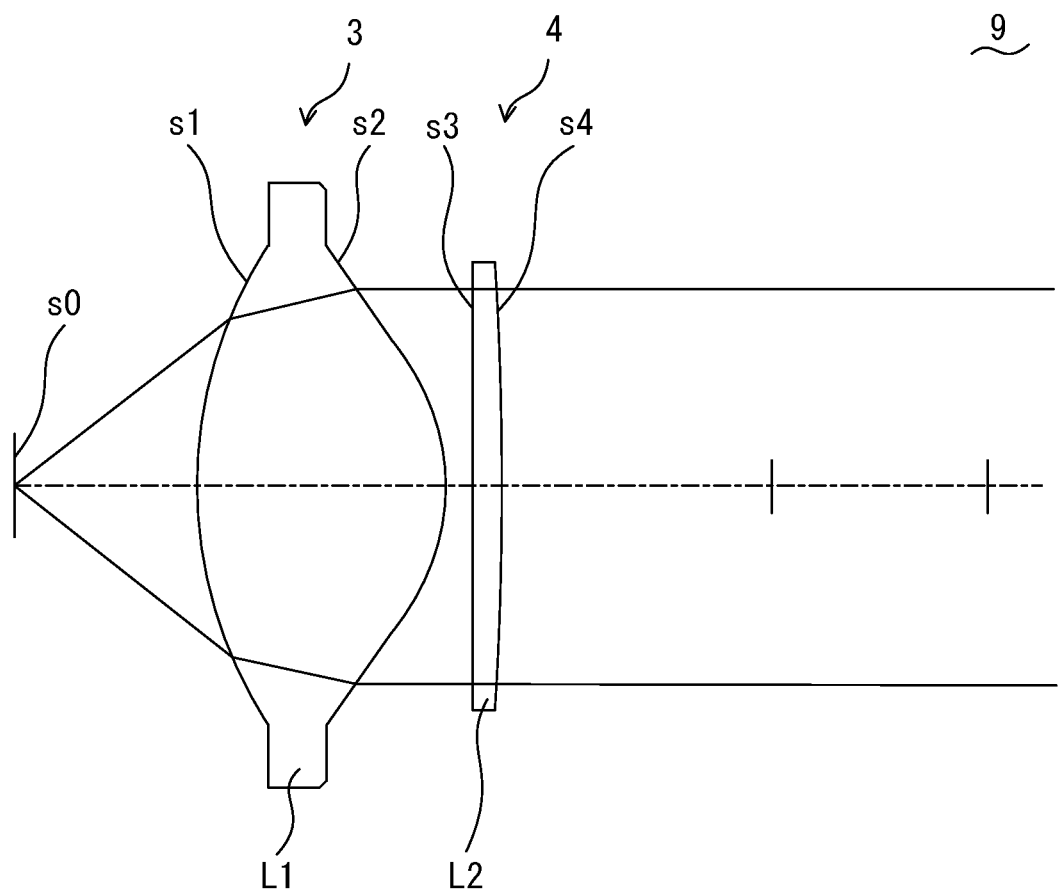
FIG. 5 illustrates a cross-section of a collimator lens according to the second embodiment of the present invention and a plano-convex lens.

As illustrated in FIG. 5, the collimator lens 3 may be used along with a lens 4 (second lens) that has lower refractive power than the collimator lens 3 and is arranged on the side of the second surface of the collimator lens 3, and the collimator lens 3 and the lens 4 may function as a collimator optical system 9 as a whole. The lens 4 is a plano-convex lens where a planar surface is orientated toward the side of the light source.

It is preferable that the collimator optical system 9 satisfies the following expression.

$|f/fs| < 0.1$  (7)

where f and fs are respectively a focal length of the collimator lens 3 and that of the lens 4.

By satisfying the conditional expression (7), performance of the collimator optical system 9 is substantially determined by the collimator lens 3. Note that |f/fs| of the collimator optical system 9 is 0.03.

Various types of the collimator optical system 9 composed of the collimator lens 3 and the lens 4 are provided below. Note that the shape of the aspherical surface (second surface) of the collimator lens 3 is as described above.

A wavelength WL1 used in the calculation, a distance WD on an optical axis between the light source and the first surface of the collimator optical system 9, a numerical aperture NA on the side of the light source of the collimator optical system 9, and a focal length f of the collimator optical system 9 are as follows.

WL1=486.13 nm, WD=6.7357 mm, NA=0.6258,
f=11.70098 mm

Lens data of the collimator optical system 9 composed of the collimator lens 3 and the lens 4 is as follows.

| s | r | d | nF | vd |
|---|---|---|---|---|
| 0 | INF | 6.7357 | 1.0 | |
| 1 | 16.4500 | 9.2500 | 1.49832 | 57.86 |
| 2* | -7.5900 | 1.0000 | 1.0 | |
| 3 | INF | 1.0000 | 1.53170 | 56.00 |
| 4 | -200.0000 | INF | 1.0 | |

Here, s, r, d, nF, and vd respectively indicate a surface number, a curvature radius (mm), an interval between surfaces (mm), a refractive index with respect to an F line, which is a wavelength WL1, and an Abbe number. A surface number s0, a surface number S1, a surface number s2, a surface number s3, and a surface number s4 respectively indicate an emission plane of the light source, the first surface of the collimator lens 3, the second surface, which is an aspherical surface, of the collimator lens 3, a first surface of the lens 4, and a second surface of the lens 4.

Third Embodiment

Figure 6:
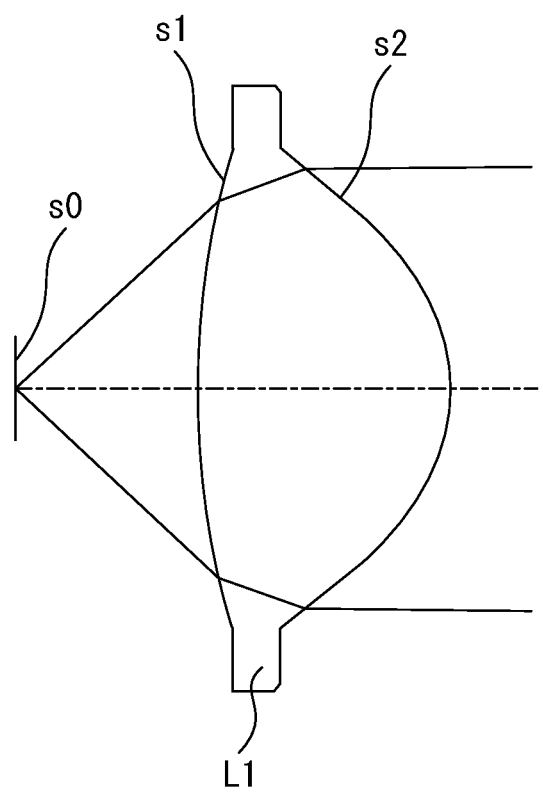
FIG. 6 illustrates a cross-section of a collimator lens according to a third embodiment of the present invention.

FIG. 6 illustrates a cross-section of a collimator lens 5 according to a third embodiment. The collimator lens 5 illustrated in FIG. 6 is configured with a double convex single lens, formed with a resinous material, for collimating a light flux emitted from a light source, and configured so that a second surface is formed as an aspherical surface assuming that a lens surface on the side of the light source is a first surface and a lens surface on a side opposite to the first surface is the second surface.

Various types of data of the collimator lens 5 according to this embodiment are described below.

A wavelength WL1 used in the calculation, a distance WD on an optical axis between the light source and the first surface of the collimator lens 5, a numerical aperture NA on the side of the light source of the collimator lens 5, and a focal length f of the collimator lens 5 are as follows.

WL1=486.13 nm, WD=6.6271 mm, NA=0.6951,
f=12.02363 mm

Lens data of the collimator lens 5 is as follows.

| s | r | d | nF | vd |
|---|---|---|---|---|
| 0 | INF | 6.6271 | 1.0 | |
| 1 | 33.1214 | 9.2500 | 1.53170 | 56.00 |
| 2* | -7.1540 | INF | 1.0 | |

Here, s, r, d, nF and vd respectively indicate a surface number, a curvature radius (mm), an interval between surfaces (mm), a refractive index with respect to an F line, which is a wavelength WL1, and an Abbe number. A surface number s0, a surface number S1, and a surface number s2 respectively indicate an emission plane of the light source, the first surface of the collimator lens 5, and the second surface, which is an aspherical surface, of the collimator lens 5.

The aspherical surface (second surface) of the collimator lens 5 is represented by the above described expression (3). A paraxial curvature radius $R_0$, a conic constant K, an aspherical coefficient $A_2$ of a second order, an aspherical coefficient $A_4$ of a fourth order, an aspherical coefficient $A_6$ of a sixth order, an aspherical coefficient $A_8$ of an eighth order, and an aspherical coefficient $A_{10}$ of a tenth order are as follows.

$R_0 = -7.1540, K = -1.0, A_2 = 0.0,$ $A_4 = -6.5090*10^{-5}, A_6 = -2.0647*10^{-6}, A_8 = 1.6581*10^{-8}, A_{10} = 1.2101*10^{-10}$ $|R1/R2| = 4.630$

Accordingly, the collimator lens 5 satisfies all the expressions (1) to (6).

Figure 7:
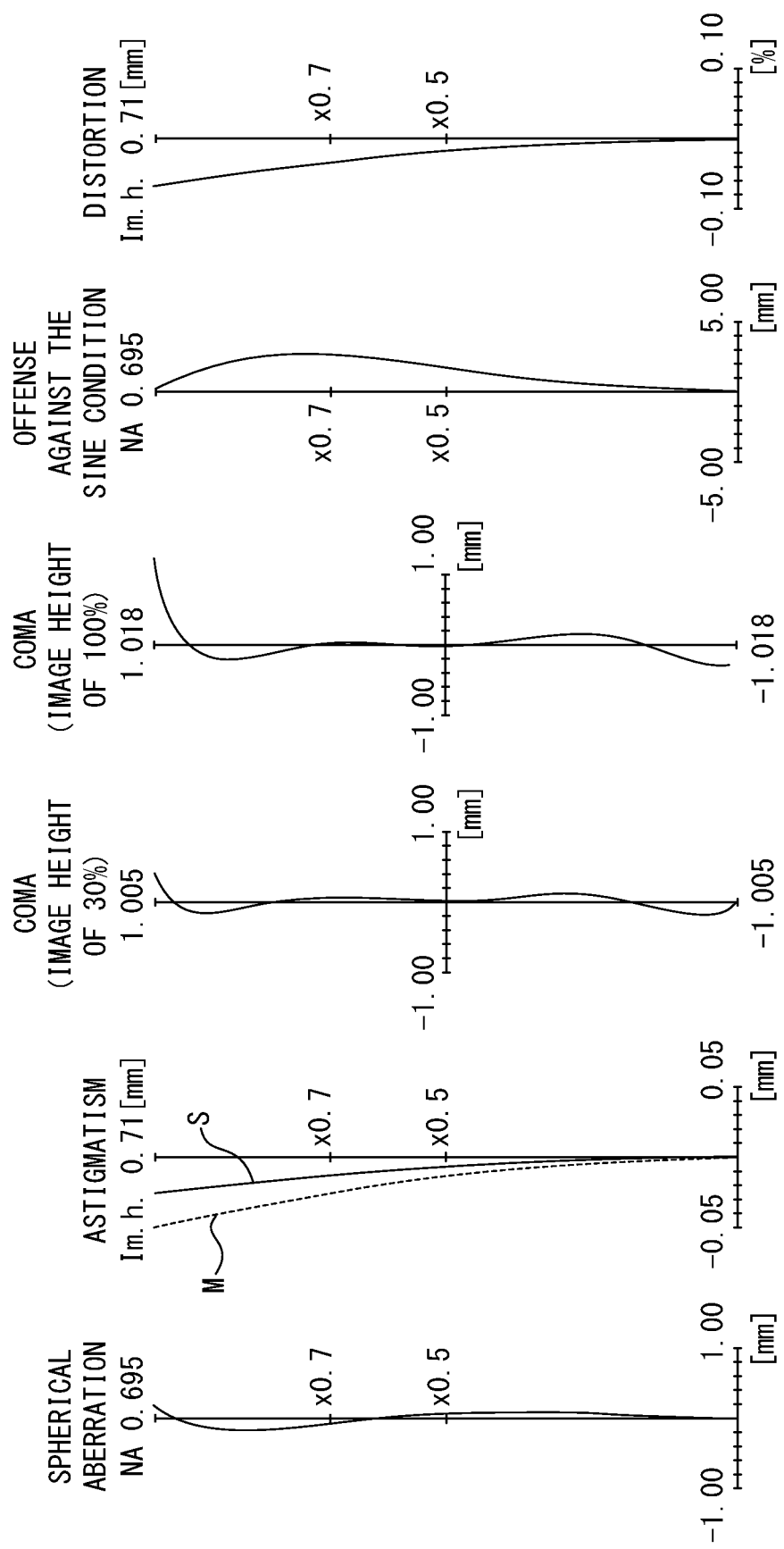
FIG. 7 illustrates aberrations of the collimator lens according to the third embodiment of the present invention.

FIG. 7 illustrates aberrations of the collimator lens 5 according to this embodiment, and illustrates the aberrations when a backlight obtained by making parallel light heading from the side of a specimen to the side of a light source incident to the collimator lens is tracked. Graphs illustrated in FIG. 7 respectively illustrate, sequentially from the left side, a spherical aberration, an astigmatism, a coma in an image height of 30 percent, a coma in an image height of 100 percent, an offense against the sine condition, and a distortion. FIG. 7 represents that all the aberrations are satisfactorily corrected. A solid line and a broken line within the graph of the astigmatism respectively represent an astigmatism of a sagittal ray (S) and that of a meridional ray (M).

Fourth Embodiment

Figure 8:
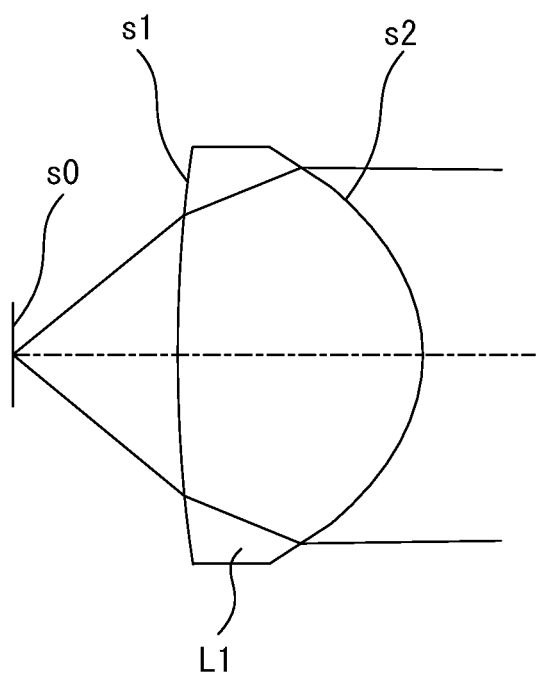
FIG. 8 illustrates a cross-section of a collimator lens according to a fourth embodiment of the present invention.

FIG. 8 illustrates a cross-section of a collimator lens 7 according to a fourth embodiment. The collimator lens 7 illustrated in FIG. 8 is configured with a double convex single lens, formed with a resinous material, for collimating a light flux emitted from a light source, and configured so that a second surface is formed as an aspherical surface assuming that a lens surface on the side of a light source is a first surface and a lens surface on a side opposite to the first surface is the second surface.

Various types of data of the collimator lens 7 according to this embodiment are described below.

A wavelength WL1 used in the calculation, a distance WD on an optical axis between the light source and the first surface of the collimator lens 7, a numerical aperture NA on the side of the light source of the collimator lens 7, and a focal length f of the collimator lens 7 are as follows.

WL1=486.13 nm, WD=6.2860 mm, NA=0.6827, f=12.01945 mm

Lens data of the collimator lens 7 is as follows.

| s | r | d | nF | vd |
|---|---|---|----|----|
| 0 | INF | 6.2860 | 1.0 | |
| 1 | 60.0000 | 9.3000 | 1.53170 | 56.00 |
| 2* | −6.7677 | INF | 1.0 | |

Here, s, r, d, nF, and vd respectively indicate a surface number, a curvature radius (mm), an interval between surfaces (mm), a refractive index with respect to an F line, which is a wavelength WL1, and an Abbe number. A surface number s0, a surface number S1, and a surface number s2 respectively indicate an emission plane of the light source, the first surface of the collimator lens 7, and the second surface, which is an aspherical surface, of the collimator lens 7.

The aspherical surface (second surface) of the collimator lens 7 is represented by the above described expression (3). A paraxial curvature radius $R_0$, a conic constant K, an aspherical coefficient $A_2$ of a second order, an aspherical coefficient $A_4$ of a fourth order, an aspherical coefficient $A_6$ of a sixth order, an aspherical coefficient $A_8$ of an eighth order, and an aspherical coefficient $A_{10}$ of a tenth order are as follows.

$R_0 = -6.7677, K=-1.0, A_2=0.0,$ $A_4=-3.5544*10^{-4}, A_6=7.6909*10^{-6}, A_8=-1.5538*10^{-7}, A_{10}=1.0858*10^{-9}$

|R1/R2|=8.866

Accordingly, the collimator lens 7 satisfies all the expressions (1) to (6).

Figure 9:
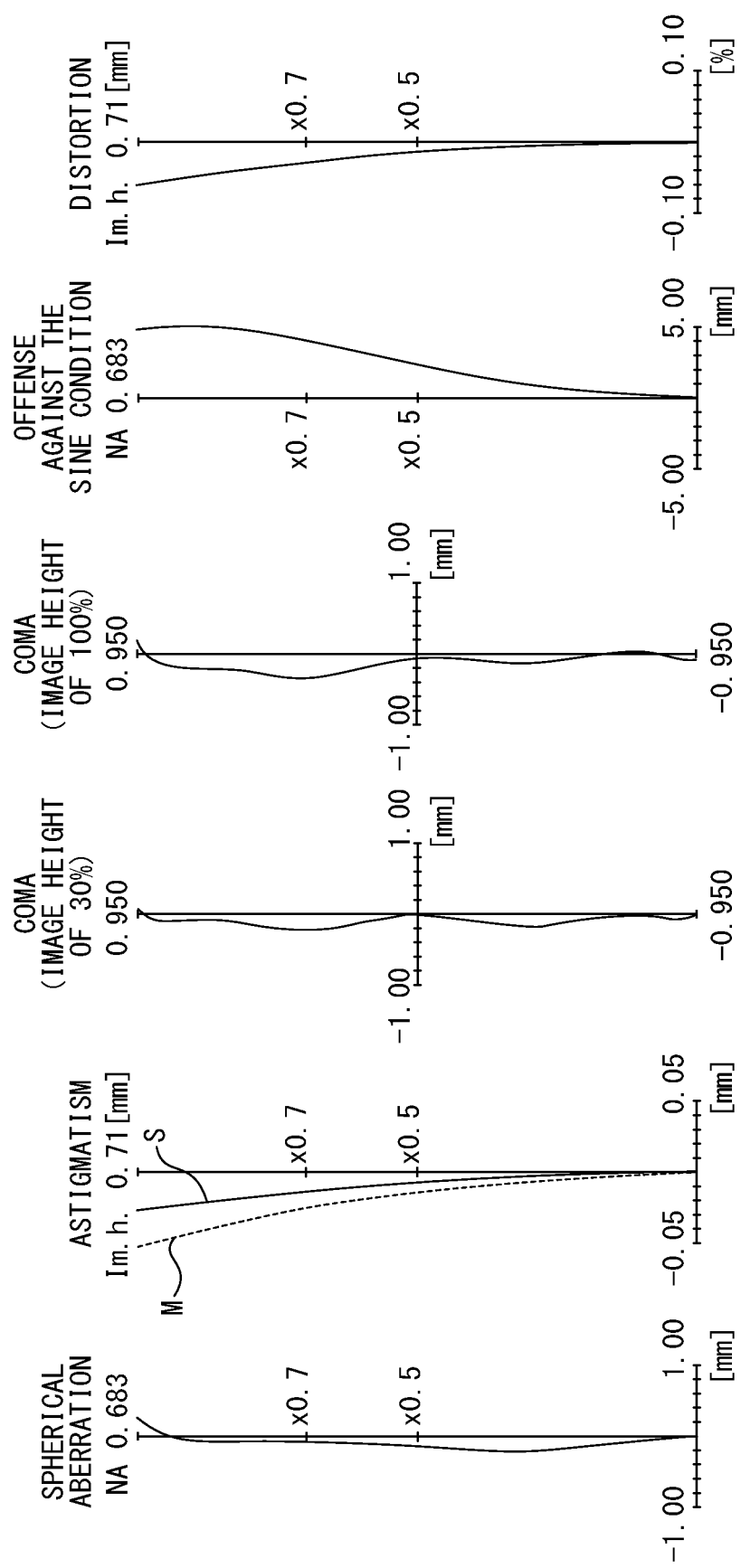
FIG. 9 illustrates aberrations of the collimator lens according to the fourth embodiment of the present invention.

FIG. 9 illustrates aberrations of the collimator lens 7 according to this embodiment, and illustrates the aberrations when a backlight obtained by making parallel light heading from the side of a specimen to the side of the light source incident to the collimator lens is tracked. Graphs represented in FIG. 9 respectively illustrate, sequentially from the left side, an on-axial spherical aberration, an astigmatism, a coma in an image height of 30 percent, a coma in an image height of 100 percent, an offense against the sine condition, and a distortion. FIG. 9 represents that all the aberrations are satisfactorily corrected. A solid line and a broken line within the graph of the astigmatism respectively represent an astigmatism of a sagittal ray (S) and that of a meridional ray (M).

Fifth Embodiment

Figure 10:
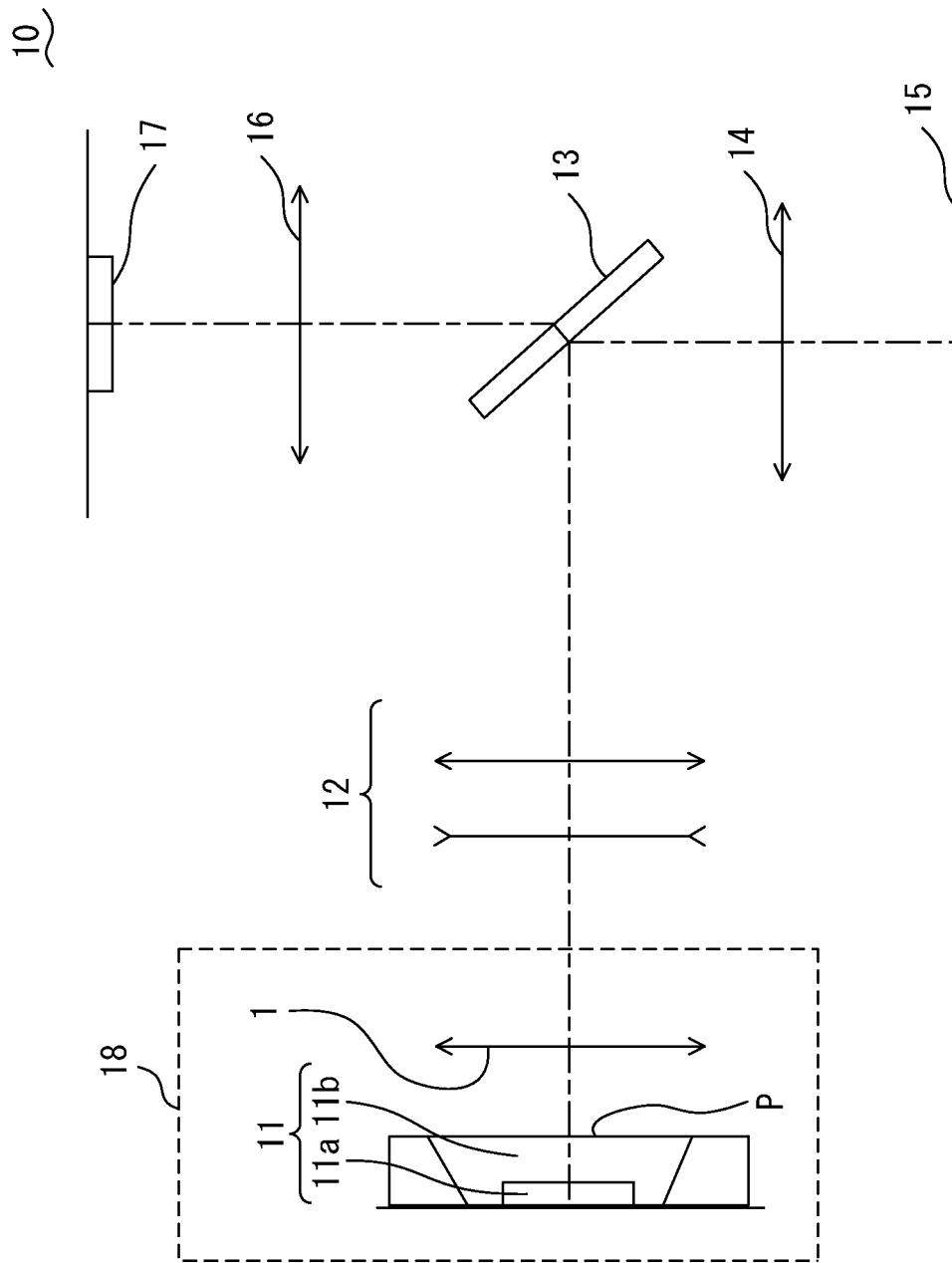
FIG. 10 illustrates a configuration of a microscope according to the fifth embodiment of the present invention.

FIG. 10 illustrates a configuration of a microscope 10 according to a fifth embodiment. The microscope 10 illustrated in FIG. 10 is a fluorescent microscope used for a fluorescent observation, and includes an illumination device 18 having an LED light source 11 and the collimator lens 1 according to the first embodiment, a beam expander 12 for expanding a diameter of a light flux collimated by the collimator lens 1, a dichroic mirror 13 for reflecting excitation light and making fluorescence from a specimen 15 pass through, an objective lens 14 of an infinity correction type for irradiating the LED excitation light on the specimen 15, an image forming optical system 16 for forming an image of the specimen 15 with the fluorescence from the specimen 15, which is incident via the objective lens 14, and an image capturing element 17 for capturing an image of the specimen 15.

The LED light source 11 is an LED light source of a surface mounting type which is composed of an LED element 11a, a solid-state light emitting element, and a sealing resin 11b for covering the LED element 11a, and in which a shape of an emission plane P for emitting the excitation light is planar.

The collimator lens 1 is configured with a double convex single lens where at least one of surfaces is formed as an aspherical surface. Moreover, since the collimator lens 1 is used by being combined with the LED light source 11 that generates less heat, the collimator lens 1 is formed with a resinous material that is more cost-effective although its heat resistance is lower than a glass material. Details of the configuration of the collimator lens 1 are as described above in the first embodiment.

In the microscope 10, the excitation light emitted from the illumination device 18 including the LED light source 11 and the collimator lens 1 is incident to the objective lens 14 via the dichroic mirror 13 after being adjusted by the beam expander 12 to a diameter of the light flux according to a pupil diameter of the objective lens 14, and irradiated on the specimen 15. The fluorescence from the specimen 15 on which the excitation light is irradiated is incident to the image capturing element 17 via the objective lens 14, the dichroic mirror 13, and the image forming optical system 16, so that an image of the specimen 15 is generated with an electric signal from the image capturing element 17.

With the illumination device 18 and the microscope 10 according to this embodiment, bright illumination where aberrations are satisfactorily corrected at low cost can be performed by including the collimator lens 1 according to the first embodiment.

FIG. 10 illustrates the example where the illumination device 18 and the microscope include the collimator lens 1 according to the first embodiment. However, the illumination device 18 and the microscope 10 may include the collimator lens according to any of the other embodiments. Moreover, FIG. 10 illustrates the LED light source 11, which is a low heat generation light source, as a light source. However, the illumination device 18 and the microscope 10 may adopt another low heat generation light source that generates less heat as a replacement for the LED light source 11. The illumination device 18 and the microscope 10 may adopt, for example, a fiber light source configured to emit light from the light source via an optical fiber. Moreover, a shape of an emission plane of most low heat generation light sources is planar.

What is claimed is:

1. A collimator lens consisting of a double convex single lens formed with a resinous material, for collimating a light flux emitted from a light source, wherein:
at least one of two opposing surfaces of the collimator lens is formed as an aspherical surface, and the collimator lens satisfies the following conditions:

$2 < |R1/R2| < 10$;

$NA > 0.6$; and $nF < f/WD$, where:

R1 is a curvature radius of a first surface, which is a lens surface on a side of the light source of the collimator lens,
R2 is a curvature radius of a second surface, which is a lens surface on a side opposite to the first surface of the collimator lens,
NA is a numerical aperture on the side of the light source of the collimator lens,
nF is a refractive index with respect to an F line of the collimator lens,
f is a focal length of the collimator lens, and
WD is a distance on an optical axis between the light source and the first surface.

2. The collimator lens according to claim 1, wherein the second surface is the aspherical surface.

3. The collimator lens according to claim 2, wherein the aspherical surface is defined by an expression:

$$Z = \frac{Y^2}{R_0 + R_0\sqrt{1 - (K+1)\left(\frac{Y}{R_0}\right)^2}} + \sum_{i=1}(A_{2i}Y^{2i})$$

and satisfies a condition:

$|A_{2i}| < 0.1$ where:
Z is a coordinate in a direction of the optical axis,
Y is a coordinate in a direction orthogonal to the optical axis,
K is a conic constant,
$R_0$ is a paraxial curvature radius of the aspherical surface, and
$A_{2i}$ is an aspherical coefficient of an even-numbered order.

4. A collimator lens consisting of a double convex single lens formed with a resinous material, for collimating a light flux emitted from a light source,
wherein at least one of two opposing surfaces of the collimator lens is formed as an aspherical surface, and the collimator lens satisfies the following conditions:

$2 < |R1/R2| < 10$; and $NA > 0.6$, where:

R1 is a curvature radius of a first surface, which is a lens surface on a side of the light source of the collimator lens,
R2 is a curvature radius of a second surface, which is a lens surface on a side opposite to the first surface of the collimator lens, and
NA is a numerical aperture on the side of the light source of the collimator lens,
wherein the second surface is the aspherical surface,
wherein the aspherical surface is defined by an expression:

$$Z = \frac{Y^2}{R_0 + R_0\sqrt{1 - (K+1)\left(\frac{Y}{R_0}\right)^2}} + \sum_{i=1}(A_{2i}Y^{2i})$$

and satisfies a condition:

$|A_{2i}| < 0.1$, where:

Z is a coordinate in a direction of an optical axis,
Y is a coordinate in a direction orthogonal to the optical axis,
K is a conic constant,
$R_0$ is a paraxial curvature radius of the aspherical surface, and
$A_{2i}$ is an aspherical coefficient of an even-numbered order,
wherein the aspherical surface satisfies a condition between aspherical coefficients of an even-numbered order equal to or higher than a second order:

$|A_{2i}| < |A_{2(i-1)}|$ where $A_{2(i-1)}$ is an aspherical coefficient of an even-numbered order lower than the $A_{2i}$.

5. An illumination device, comprising:
a low heat generation light source; and
a collimator lens consisting of a double convex single lens formed with a resinous material, for collimating a light flux emitted from a light source,
wherein at least one of two opposing surfaces of the collimator lens is formed as an aspherical surface, and the collimator lens satisfies the following conditions:

$2 < |R1/R2| < 10$; and $NA > 0.6$, where:

R1 is a curvature radius of a first surface, which is a lens surface on a side of the light source of the collimator lens,
R2 is a curvature radius of a second surface, which is a lens surface on a side opposite to the first surface of the collimator lens, and
NA is a numerical aperture on the side of the light source of the collimator lens.

6. The illumination device according to claim 5, further comprising a second lens on a side of the second surface of the collimator lens,
wherein the illumination device satisfies a condition:

$|f/fs| < 0.1$ where f is a focal length of the collimator lens and fs is a focal length of the second lens.

7. A microscope, comprising:
the illumination device according to claim 5; and
an image forming optical system for forming an image of a specimen with light from the specimen via an objective lens.

* * * * *